US010764277B2

(12) United States Patent
Mortimore, Jr. et al.

(10) Patent No.: US 10,764,277 B2
(45) Date of Patent: *Sep. 1, 2020

(54) CUSTOMIZED USER VALIDATION

(71) Applicant: salesforce.com, inc., San Francisco, CA (US)

(72) Inventors: William Charles Mortimore, Jr., San Francisco, CA (US); Sergio Isaac Koren, Foster City, CA (US); Paul Anthony Mason, Port Talbot (GB); Alan Vangpat, Pittsburgh, PA (US)

(73) Assignee: salesforce.com, inc., San Francisco ( * ) Notice: Subject to any disclaimer, the term of this patent is extended or adjusted under 35 U.S.C. 154(b) by 0 days.

This patent is subject to a terminal disclaimer.

(21) Appl. No.: 16/030,706

(22) Filed: Jul. 9, 2018

(65) Prior Publication Data

US 2018/0337913 A1 Nov. 22, 2018

Related U.S. Application Data

(63) Continuation of application No. 14/682,324, filed on Apr. 9, 2015, now Pat. No. 10,021,089.

(51) Int. Cl.
*H04L 29/06* (2006.01)

(52) U.S. Cl.
CPC ........ *H04L 63/083* (2013.01); *H04L 63/0838* (2013.01); *H04L 63/102* (2013.01); *H04L 2463/082* (2013.01)

(58) Field of Classification Search
CPC . H04L 63/083; H04L 63/0838; H04L 63/102; H04L 2463/082
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Final Office Action for U.S. Appl. No. 14/682,324 dated Dec. 8, 2016, 10 pages.

(Continued)

*Primary Examiner* — Sarah Su
(74) *Attorney, Agent, or Firm* — Jaffery Watson Mendonsa & Hamilton LLP

(57) ABSTRACT

Mechanisms and techniques for customized user validation. A login attempt is received from a remote electronic device with one or more computing devices that provide access to one or more resources. The login attempt is analyzed to determine a profile from a plurality of profiles corresponding to the login attempt. The one or more computing devices support the plurality profiles with each profile having a corresponding flow. The flow corresponding to the profile is performed prior to allowing continuation of the login attempt. The login attempt is continued, via the one or more computing devices, after the flow corresponding to the profile is completed. Access is granted to the one or more resources, via the one or more computing devices, in response to a successful completion of the login attempt.

17 Claims, 4 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,892,828 A | 4/1999 | Perlman |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,430,626 B1 | 8/2016 | Rome et al. |
| 10,021,089 B2* | 7/2018 | Mortimore, Jr. ...... H04L 63/083 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0055570 A1 | 3/2005 | Kwan et al. |
| 2005/0091098 A1 | 4/2005 | Brodersen et al. |
| 2005/0257138 A1* | 11/2005 | Chory ................ G06F 16/954 715/234 |
| 2007/0214497 A1 | 9/2007 | Montgomery et al. |
| 2008/0235375 A1 | 9/2008 | Reynolds et al. |
| 2009/0177744 A1 | 7/2009 | Marlow et al. |
| 2010/0017860 A1 | 1/2010 | Ishida |
| 2011/0035592 A1 | 2/2011 | Cha et al. |
| 2011/0162067 A1 | 6/2011 | Shuart et al. |
| 2011/0231919 A1* | 9/2011 | Vangpat ............ H04L 63/0815 726/8 |
| 2012/0023554 A1 | 1/2012 | Murgia et al. |
| 2012/0144464 A1 | 6/2012 | Fakhrai et al. |
| 2014/0033278 A1* | 1/2014 | Nimashakavi ......... G06F 21/40 726/4 |
| 2014/0033280 A1* | 1/2014 | Nimashakavi ...... H04L 63/0807 726/4 |
| 2014/0115488 A1 | 4/2014 | Hackborn |
| 2014/0331317 A1* | 11/2014 | Singh ................... G06F 21/52 726/22 |
| 2015/0113626 A1 | 4/2015 | Alvarez et al. |
| 2015/0254432 A1 | 9/2015 | Stumm et al. |
| 2016/0065558 A1* | 3/2016 | Suresh ................... H04L 63/08 726/7 |
| 2016/0065568 A1 | 3/2016 | Dave et al. |
| 2016/0219039 A1 | 7/2016 | Houthooft et al. |
| 2016/0266881 A1 | 9/2016 | Thompson et al. |
| 2018/0103050 A1* | 4/2018 | Mason ............... H04L 63/1483 |
| 2018/0268415 A1* | 9/2018 | Hwang ............... G06Q 20/325 |

OTHER PUBLICATIONS

Final Office Action for U.S. Appl. No. 14/682,324 dated Sep. 21, 2017, 12 pages.

Non-Final Office Action for U.S. Appl. No. 14/682,324 dated Apr. 5, 2017, 11 pages.

Non-Final Office Action for U.S. Appl. No. 14/682,324 dated Jul. 1, 2016, 9 pages.

(56) References Cited

OTHER PUBLICATIONS

Notice of Allowance for U.S. Appl. No. 14/682,324 dated Mar. 9, 2018, 8 pages.

\* cited by examiner

CUSTOMIZED USER VALIDATION

CLAIM OF PRIORITY

This application is a continuation of U.S. patent application Ser. No. 14/682,324, entitled "CUSTOMIZED USER VALIDATION," filed Apr. 9, 2015, now U.S. Pat. No. 10,021,089 issued Jul. 10, 2018, the contents of which are incorporated herein by reference in their entirety.

TECHNICAL FIELD

Embodiments relate to user validation techniques. More particularly, embodiments relate to mechanisms and techniques for providing customized user validation experiences.

BACKGROUND

User validation often consists of a user interface where the user provides a user name and password or other identifying information. While this may be sufficient in many situations, there currently exist environments and/or situations where these current techniques are insufficient.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
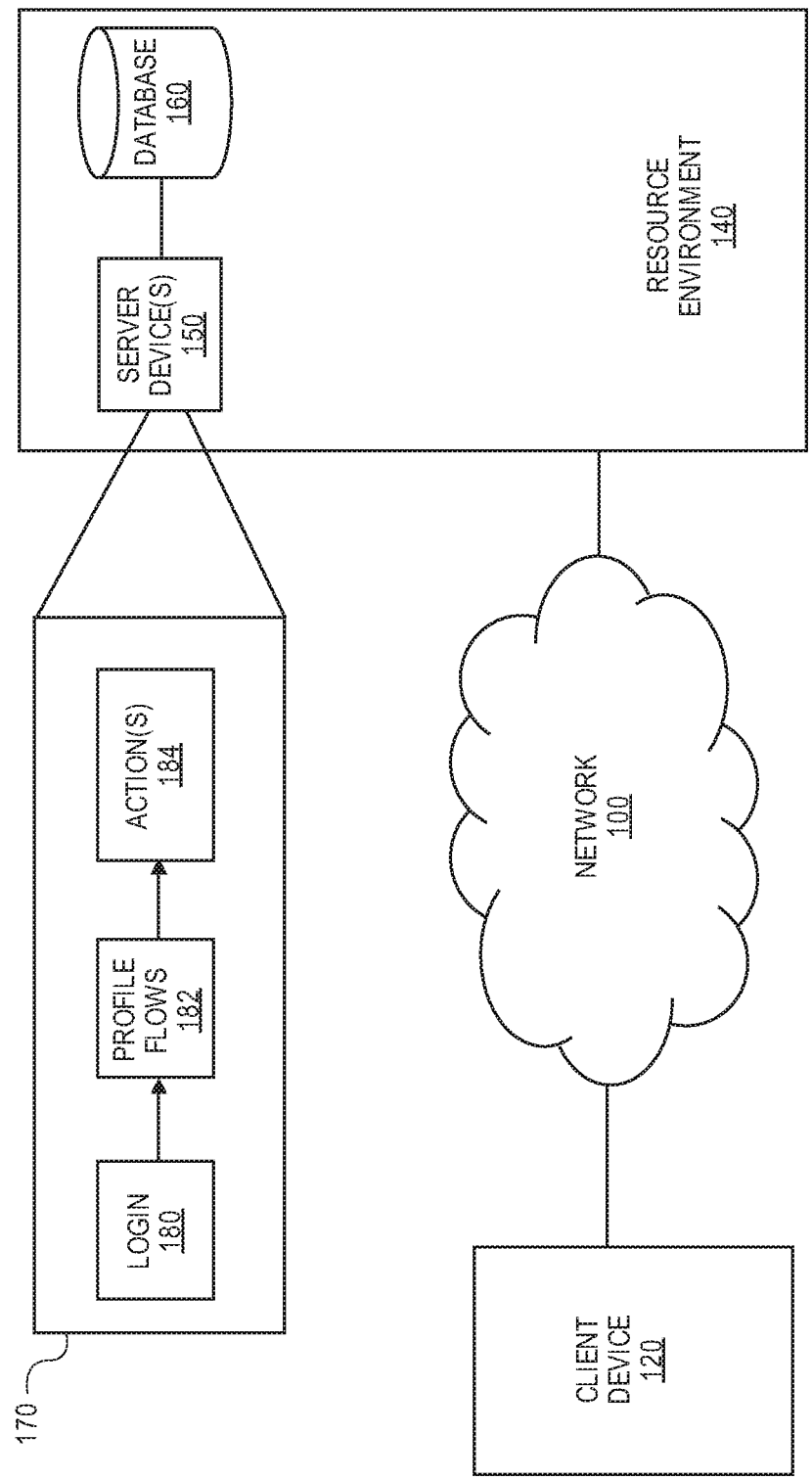
FIG. 1 is a conceptual diagram of one embodiment an architecture that can provide customized user validations.

In the following description, numerous specific details are set forth. However, embodiments of the invention may be practiced without these specific details. In other instances, well-known circuits, structures and techniques have not been shown in detail in order not to obscure the understanding of this description.

Various embodiments of mechanisms for providing customized user verification and/or authentication are provided herein. In one embodiment, a system administrator (or other entity) can assign a flow to a profile that will be executed when the user corresponding to the profile logs in. In one embodiment, this applies to user interface (UI) login attempts. In another embodiment, this applies to application program interface (API) login attempts.

In one embodiment, third party flows can be utilized for this process, for example, time-based one-time password (TOTP) flows, YubiKey flows, two-factor authentication, etc. YubiKey is a hardware authentication device that changes passwords every time it is used. In default mode, the YubiKey works by emitting a one-time password (OTP) by emulating a USB keyboard. As USB keyboards are supported by almost all modern computers, the YubiKey requires no additional client software. YubiKey is available from Yubico of Palo Alto, Calif. YubiKey is just one example of a strong two-factor authentication hardware solution. Other mechanisms can also be supported.

In one embodiment, a framework to pass additional parameters into an authentication/verification flow and accept output to control the authentication process is provided. For example, information about how the user logged in (e.g., SAML, username/password login), their IP address, and the browser's user agent are passed in to the flow, and can be used during the flow to determine whether a user needs additional verification, or whether they should be granted a higher access session. Output variables can be used to either block the user (and force a logout), or to change where the user gets redirected after login.

In one embodiment, an API is provided to manipulate the user's session and allow validation of standard app two-factor functionality, so administrators can leverage existing functionality during validation. This can also be used to control the user's session access level, among other things.

In one embodiment, login flow mechanisms also give the ability for administrators to execute unrelated logic after login. For example, when coming in to an environment via a third party (e.g., Twitter), certain user parameters may not have been properly populated (such as the email address). A login flow can be presented as a way to force the user to fill in this missing information before they can access the application.

In one embodiment, a login flow can provide the ability to build custom business processes and invoke one or more of these processes as users log in to the corresponding environment, for example, an on-demand services environment. This allows integration of a custom process with an authentication engine provided by the on-demand services environment provider, as well as the ability for users to participate in the authentication decision process during the login process.

For example, Administrators can create multiple flows and associate each one with a different user profile. This allows organizations to have one group of people (e.g., sales reps) going through one business process as they log in, and another group (e.g., support reps) going through another business process as they log in.

In one embodiment, once a login flow is associated with a profile, it automatically applies to every user interface (UI) login for that profile. This includes the on-demand services environment, associated communities and environments, or even client applications that use, for example, OAuth for authentication. Login flows work with multiple types of authentication that are supported on the platform; not only the standard username and password authentication, but also single sign-on and social sign-on. For example, users logging in with their LINKEDIN® account can go through a specific login flow for LINKEDIN® users.

In one embodiment, a login flow can be built with a flow designer or other graphical programming mechanism, or visual workflow mechanism. After the login flow is created, it is connected or associated with one or more profiles that will utilize the login flow. In one embodiment, once the login flow is associated with one or more user profiles, every user with that profile is redirected through the flow during the login process. In one embodiment, techniques described herein can provide internal support with a means of downloading created flows to local machines and also allows downloaded flows to be uploaded to a customer's environment, where the administrator may choose to link it to a profile for login flow use.

In one embodiment, to invoke a login flow, the user must be authenticated. In one embodiment, this means that login flows do not allow replacement of the existing on-demand services environment authentication process. Rather, it allows integration of new steps or adding user participation to the authentication process. In one embodiment, during the execution of the login flow, users have restricted access. Users within a login flow have access to the flow, only. This means users cannot bypass the flow to get to the application. So, the only way for users to complete the authentication process and login to the organization is by successfully authenticating and completing the login flow steps.

The following list provides a few examples of things that can be accomplished with the login flows described herein. The user login experience can be enhanced and/or customized by, for example, displaying a corporate logo or a custom message during the login process. User data can be collected and/or updated by, for example, collecting an email address, a phone number or physical address from the user during the login process. Procedures can be completed by, for example, asking users to accept terms of service or other agreement.

The login flow can connect to an external identity service or geo-fencing service to collect, or verify, information about the user. Strong or two-factor authentication can be accomplished with different methods of authentication, for example, hardware authentication, short message service (SMS), biometric authentication and/or other methods of authentication can be utilized. A confirmation process can be utilized in the login flow. For example, a user can define a secret question (e.g., favorite book) and the user may be required to answer the question to satisfy the login flow. System and/or administrator feedback can be part of the login flow, for example, an administrator may be sent a notice for each login attempt.

FIG. 1 is a conceptual diagram of one embodiment an architecture that can provide customized user validations. In the example of FIG. 1, client device 120 can be used to access one or more resources provided by resource environment 140. Client device 120 can be any type of computing device. For example, client device 120 can be a desktop computer, a laptop computer, a tablet, a smartphone, a wearable device, a kiosk, an automobile, a television, etc. In one embodiment, client device 120 allows a user (not illustrated in FIG. 1) to interact with resource environment 140 by providing input and receiving output.

Network 100 can be any type of network capable of connecting client device 120 with resource environment 140. Network 100 can be wired, wireless or any combination thereof. Network 100 can be any combination of local area networks (LANs), wide area networks (WANs), personal area networks (PANs), etc.

Resource environment 140 can be any combination of computing devices and/or resources to provide information and/or services to client device 120 via network 100. Resource environment 140 can be, for example, an on-demand services environment (various embodiments discussed in greater detail below). Server device(s) 150 can provide any type of service and/or data to client device including, for example, access to database 160.

In one embodiment, when a user uses client device 120 to attempt access to one or more resources in resource environment 140, customized user validation 170. Customized user validation 170 is but one simple example of a customized user validation. Many other configurations and arrangement can also be supported. The example of FIG. 1 provides only one customized user validation. In one embodiment, a customized user validation is provided for each type of profile supported by resource environment 140.

In one embodiment, when attempting to access resource environment 140, a user is presented with login interface 180, which can be, for example, a login screen requesting a user name and/or password, or any other type of login interface. In response to receiving some login information, a profile for the user and/or client device is determined. The profile can be based on, for example, the user's position within an organization (e.g., sales, IT, legal, support), whether or not the user has completed required activities (e.g., complete HR profile, training certificates, agreed to terms of service), additional verification/validation can be performed (e.g., third-party validation, two-factor authentication, TOTP) and/or other types of information.

In one embodiment, before the log in process is completed, the user is routed through profile flow(s) 182 and any corresponding action(s) 184 can be taken. For example, requested information can be stored in a database or forwarded to appropriate parties, licenses can be acquired/registered, etc. When the login and profile flows have been completed, the user can be granted access to the resource(s) of resource environment 140.

Figure 2:
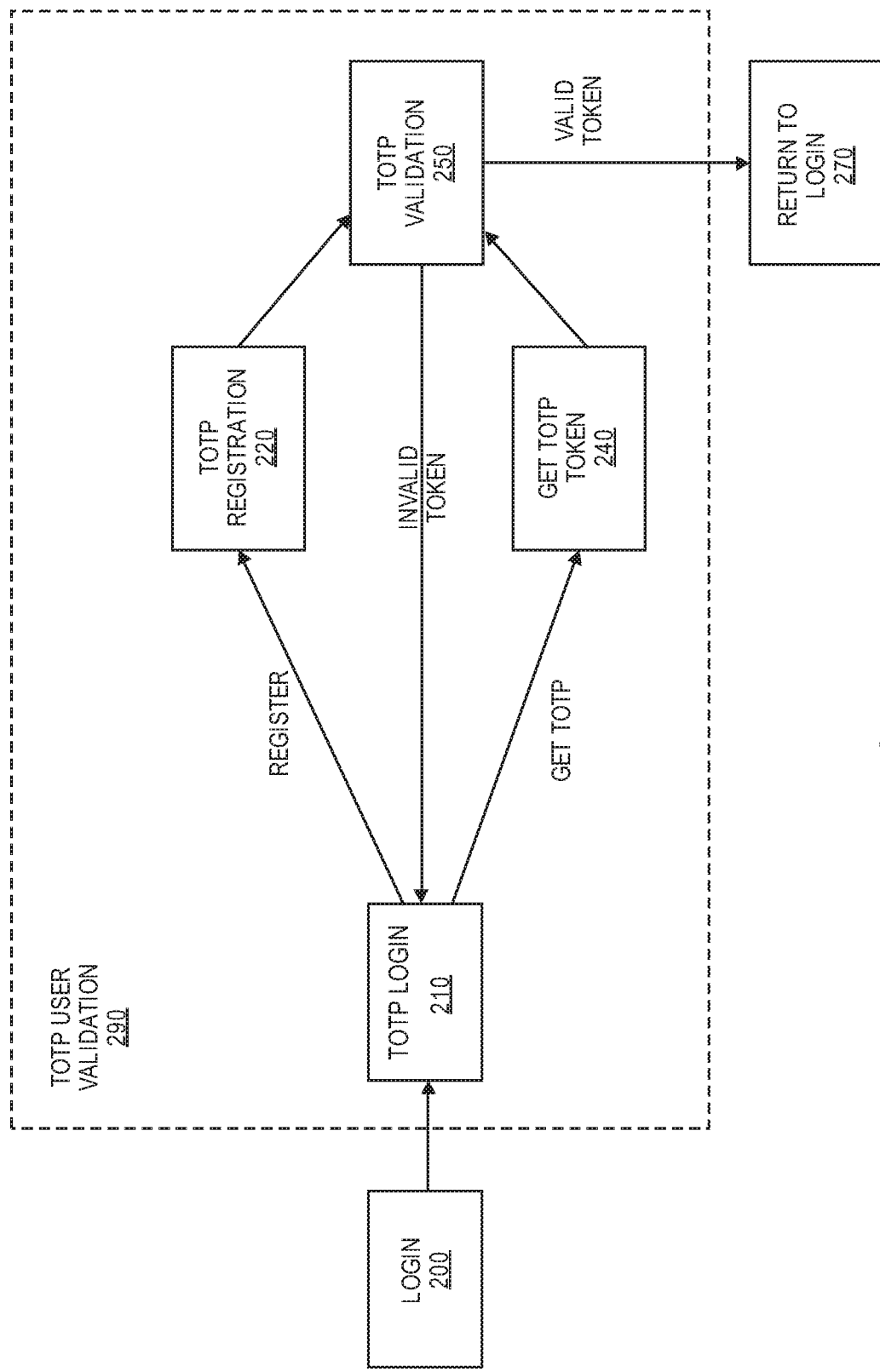
FIG. 2 is a flow diagram of one embodiment of a time-based one-time password (TOTP) authentication flow that can be used to provide customized user validations.

FIG. 2 is a flow diagram of one embodiment of a time-based one-time password (TOTP) authentication flow that can be used to provide customized user validations. FIG. 2 is but one example of a customized user validation flow. As another alternative to the TOTP authentication described with respect to FIG. 2, various types of two-factor authentication can be supported, for example, a Universal Serial Bus (USB)-based One-Time Passcode (OTP) device can be utilized. As a further variant, near field communication (NFC) can be used to support two-factor authentication.

In one embodiment, a user is presented, or otherwise accesses, login interface 200. Login interface 200 can be any type of login interface, for example, a graphical user interface through which a user can provide a user name and/or password. Other login interfaces can also be utilized, for example, fingerprint scanners, voice recognition can also be supported.

In response to login 200, as discussed above, a profile can be determined. The profile can be determined based on, for example, the user name, the geographical location of the requesting device, the time of day, the organizational position of the user, the number of logins attempted, the type of device used to login, etc. In response to determining the profile, a custom user validation flow may be utilized. In the example of FIG. 2, the custom user validation flow is a TOTP user validation; however, any type of flow can be supported.

In one embodiment, the user is presented with TOTP login interface 210. The user may be allowed to register or to provide sufficient information to generate a one-time password. If the user wishes to register, the user can be routed to TOTP registration 220, which provides access to the registration process. If the user has registered and wishes to generate a one-time password, the user can be routed to a TOTP interface to get a TOTP token 240.

After TOTP registration 220 or getting TOTP token 240, the user is routed to TOTP validation 250. If the validation is successful, the user is returned to login flow 270. If the validation is not successful, the user can be returned to TOTP login 210, or the login process can be terminated.

Multiple profile types can be supported concurrently. For example, some users may be required to use TOTP validation 290, while other users may be required to use a fingerprint scanner (not illustrated in FIG. 2). The custom login flows described herein can also be extended beyond validation procedures. For example, personal information may be periodically gathered and/or updated. These other customized login flows may be performed independently of the validation flows.

As further custom login flow examples, email confirmation may be utilized where an email is sent with a verification code that must be entered to complete the login process. Conditional two-factor authentication can be supported where two-factor authentication is used for untrusted addresses/devices and the two-factor authentication is not used for trusted addresses/devices. A user may be required to accept terms of service via a custom login flow.

Figure 3:
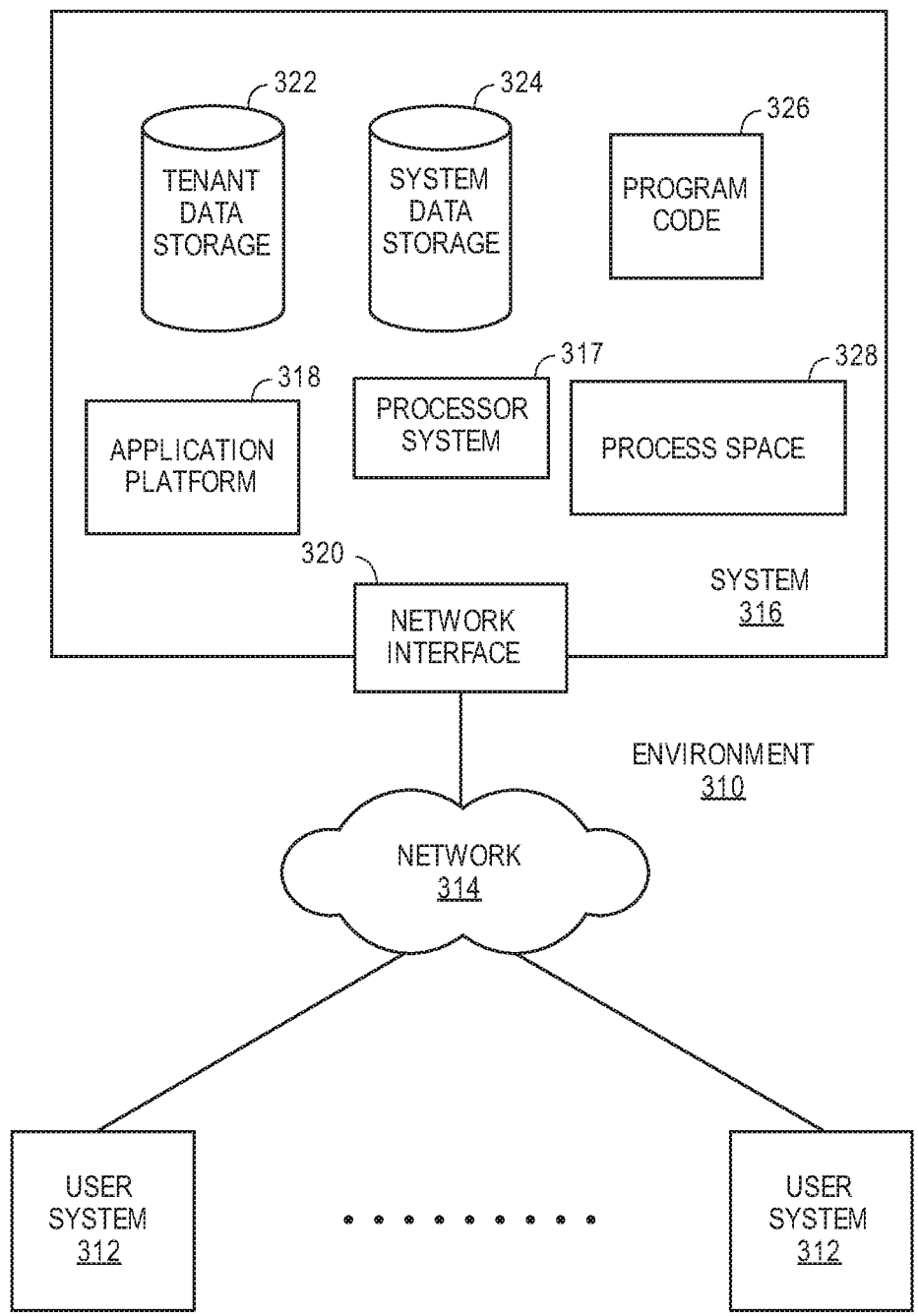
FIG. 3 is a block diagram of one environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 4:
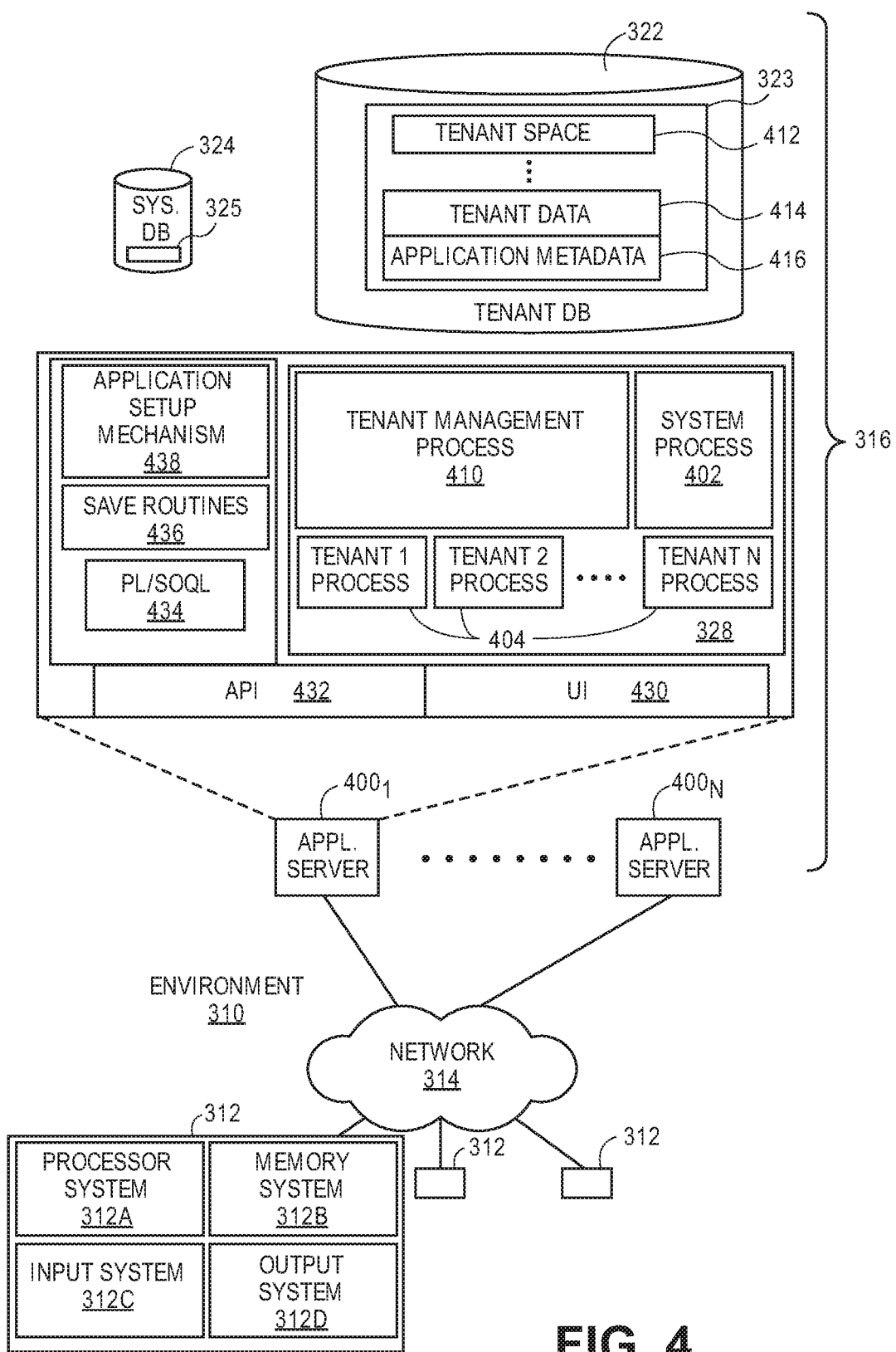
FIG. 4 is a block diagram of one embodiment of elements of environment of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage space 412, tenant data 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage space 412, which can be either a physical arrangement and/or a logical arrangement of data. Within each tenant storage space 412, tenant data 414 and application metadata 416 might be similarly allocated for each user. For example, a copy of a user's most recently used (MRU) items might be stored to tenant data 414. Similarly, a copy of MRU items for an entire organization that is a tenant might be stored to tenant storage space 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process space 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multitenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    receiving a login attempt with one or more computing devices that provide access to one or more resources, the login attempt from a remote electronic device;
    initiating a generic user validation flow in response to receiving the login attempt;
    analyzing the login attempt, as part of the generic user validation flow, to determine a login profile corresponding to the login attempt from a plurality of login profiles, wherein each login profile has a corresponding specific custom flow, each login profile having one or more corresponding users and every user with a selected profile is redirected through the corresponding specific custom flow for the selected profile during the login attempt;
    causing the specific custom flow corresponding to the login profile to be performed prior to allowing continuation of the generic user validation flow;
    allowing continuation of the generic user validation flow, via the one or more computing devices, after the specific custom flow corresponding to the login profile is completed; and
    granting access to the one or more resources, via the one or more computing devices, in response to a successful completion of the specific custom flow and the generic user validation flow at a level determined corresponding to the login profile and evaluation of user input from the custom flow.

2. The method of claim 1 wherein the specific custom flow corresponding to the login profile comprises a presentation of one or more terms and conditions, and acceptance of the one or more terms and conditions by the user.

3. The method of claim 1 wherein the specific custom flow corresponding to the login profile comprises verification or updating of user contact information.

4. The method of claim 1 wherein the specific custom flow corresponding to the login profile requests user-specific information from a user via a graphical user interface on the remote electronic device.

5. The method of claim 1 wherein the specific custom flow corresponding to the login profile gathers device-specific information from the remote electronic device.

6. A non-transitory computer-readable medium having stored thereon instructions that, when executed by one or more processors, cause the one or more processors to:
    receive a login attempt with one or more computing devices that provide access to one or more resources, the login attempt from a remote electronic device;
    initiate a generic user validation flow in response to receiving the login attempt;
    analyze the login attempt, as part of the generic user validation flow, to determine a login profile corresponding to the login attempt from a plurality of login profiles, wherein each login profile has a corresponding specific custom flow, each login profile having one or more corresponding users and every user with a selected profile is redirected through the corresponding specific custom flow for the selected profile during the login attempt;
    cause the specific custom flow corresponding to the login profile to be performed prior to allowing continuation of the generic user validation flow;
    allow continuation of the generic user validation flow, via the one or more computing devices, after the specific custom flow corresponding to the login profile is completed; and
    grant access to the one or more resources, via the one or more computing devices, in response to a successful completion of the specific custom flow and the generic user validation flow at a level determined corresponding to the login profile and evaluation of user input from the custom flow.

7. The non-transitory computer-readable medium of claim 6 wherein the specific custom flow corresponding to the login profile comprises a presentation of one or more terms and conditions, and acceptance of the one or more terms and conditions by the user.

8. The non-transitory computer-readable medium of claim 6 wherein the specific custom flow corresponding to the login profile comprises verification or updating of user contact information.

9. The non-transitory computer-readable medium of claim 6 wherein the specific custom flow corresponding to the login profile requests user-specific information from a user via a graphical user interface on the remote electronic device.

10. The non-transitory computer-readable medium of claim 6 wherein the specific custom flow corresponding to the login profile gathers device-specific information from the remote electronic device.

11. The non-transitory computer-readable medium of claim 6 wherein the one or more resources comprise at least an on-demand services environment having at least one database.

12. A system of electronic computing devices to provide one or more resources, the system of electronic computing devices to:
receive a login attempt from a remote electronic device;
initiate a generic user validation flow in response to receiving the login attempt;
analyze the login attempt, as part of the generic user validation flow, to determine a login profile corresponding to the login attempt from a plurality of login profiles, wherein each login profile has a corresponding specific custom flow, each login profile having one or more corresponding users and every user with a selected profile is redirected through the corresponding specific custom flow for the selected profile during the login attempt;
cause the specific custom flow corresponding to the login profile to be performed prior to allowing continuation of the generic user validation flow;
allow continuation of the generic user validation flow, via the one or more computing devices, after the specific custom flow corresponding to the login profile is completed; and
grant access to the one or more resources, via the one or more computing devices, in response to a successful completion of the specific custom flow and the generic user validation flow at a level determined corresponding to the login profile and evaluation of user input from the custom flow.

13. The system of claim 12 wherein the specific custom flow corresponding to the login profile comprises a presentation of one or more terms and conditions, and acceptance of the one or more terms and conditions by the user.

14. The system of claim 12 wherein the specific custom flow corresponding to the login profile comprises verification or updating of user contact information.

15. The system of claim 12 wherein the specific custom flow corresponding to the login profile requests user-specific information from a user via a graphical user interface on the remote electronic device.

16. The system of claim 12 wherein the specific custom flow corresponding to the login profile gathers device-specific information from the remote electronic device.

17. The system of claim 12 wherein the one or more resources comprise at least an on-demand services environment having at least one database.

* * * * *